Aug. 24, 1948.   E. C. SEWARD   2,447,542
MATERIAL HANDLING PALLET
Filed Aug. 13, 1947   3 Sheets-Sheet 1
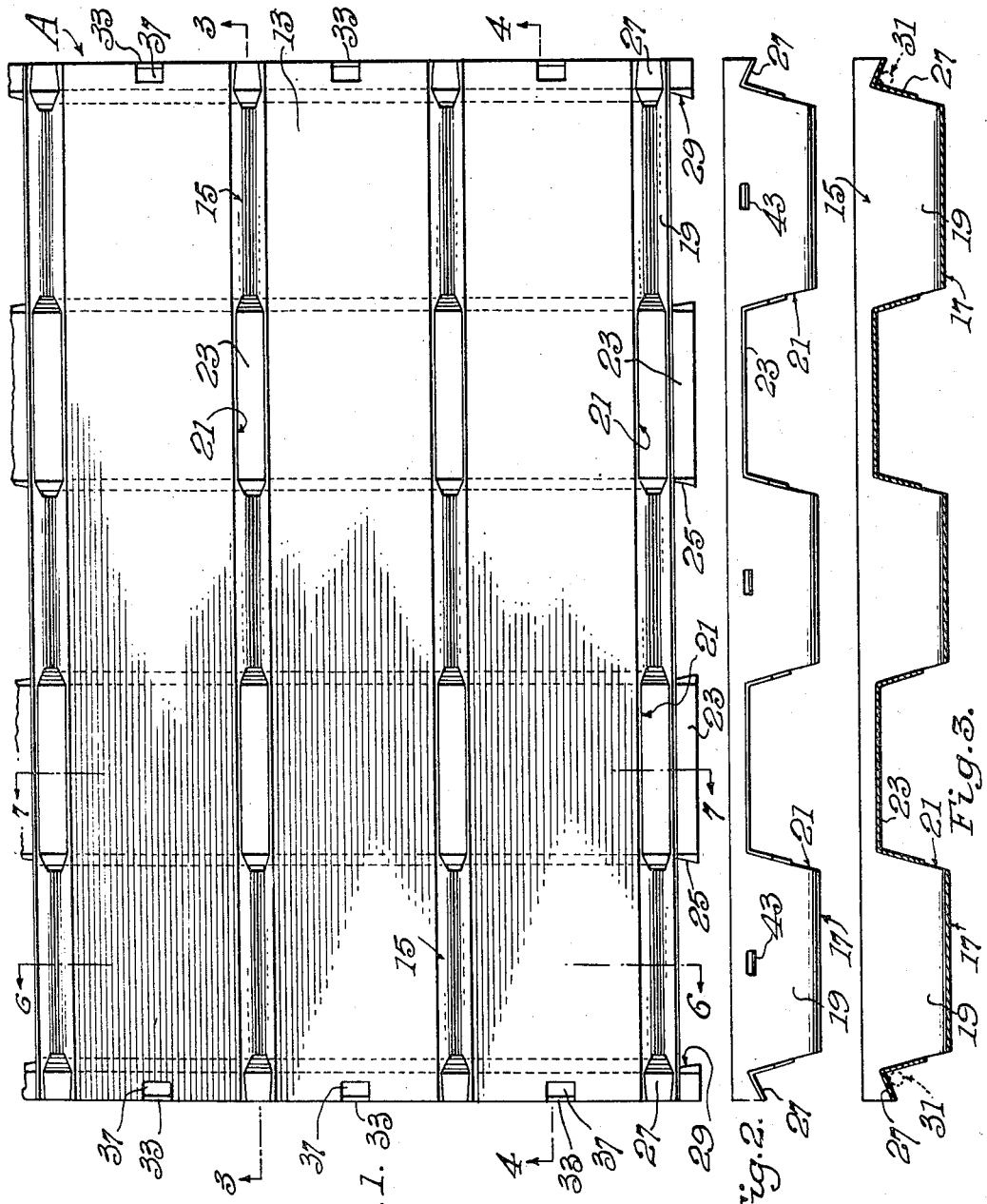
Inventor
Edgar C. Seward
By [signatures]
Attorneys

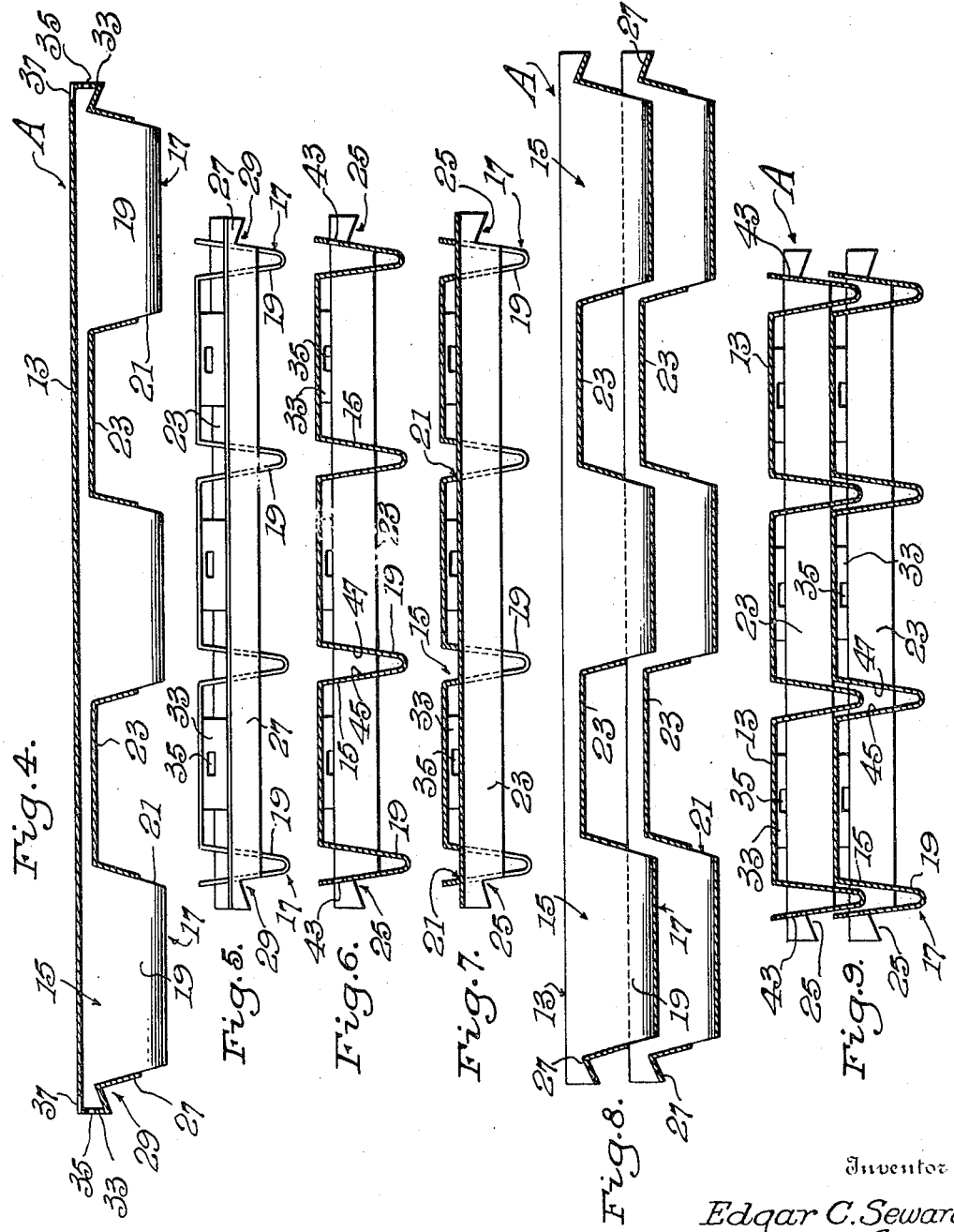

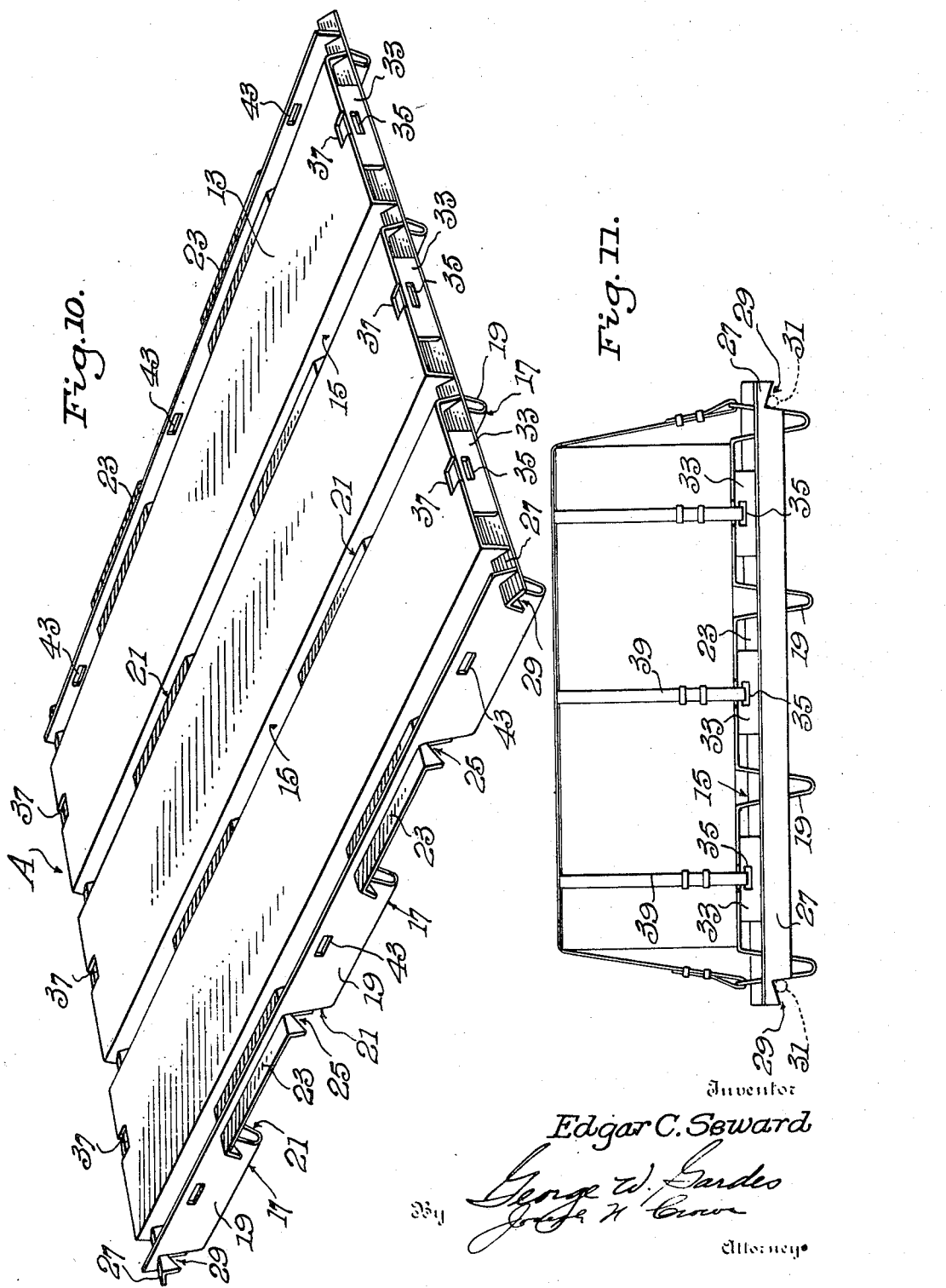

Patented Aug. 24, 1948

2,447,542

UNITED STATES PATENT OFFICE 2,447,542

MATERIAL HANDLING PALLET

Edgar C. Seward, Arlington, Va.

Application August 13, 1947, Serial No. 768,406

4 Claims. (Cl. 248—120)

(Granted under the act of March 3, 1883, as amended April 30, 1928; 370 O. G. 757)

The invention described herein may be manufactured and used by or for the Government for governmental purposes, without payment to me of any royalty thereon.

In accordance with the present invention there are provided certain improvements in material handling mechanism. More particularly, the invention relates to the type of material handling platforms known at the present time in the art as skids or pallets.

At the present time, for many applications and uses, such as in warehouses, foundries, shiploadings and various other lines of business, use is made of skids or pallets for transporting goods from place to place, the skid being adapted to rest upon a floor or other flat surface and being so constructed as to permit the insertion of the forks of a lift truck therebeneath, to be elevated to clear the skid or pallet from its support. Also, such devices are employed widely in cargo loading operations for ships, they being provided for such purpose with means for attaching cables to be operated by a hoisting boom for permitting the cargo on the devices to be stowed in the holds of the ship without removal thereof from the devices, as well as to hoist the device and cargo into the ship and break down the draft in the square of the hatch, thus unloading the device and using only for hoisting, which accordingly form means for unloading readily the cargo when the destination thereof is reached. The present invention provides a pallet which may be employed either as a skid to be manipulated with a lift truck, or for cargo handling purposes.

For the latter purpose particularly, it is desirable that the empty or unloaded pallets occupy the smallest storage space possible. To this end, the pallets of the invention are constructed so that, when empty, one pallet may be nested readily into another, thereby minimizing storage space required for the transportation of empty pallets.

Also, in the preparation of a load upon a pallet or skid, it is important that the supporting parts of the pallet be distributed throughout the outline of the base of the load, so as to insure that there shall be adequate support at spaced points for each box or crate and thus make it unnecessary to rely too strictly upon the strength of the individual boxes or crates, and it is important also that the support provided by the pallet extends substantially to the outer faces of the group of boxes or crates. Accordingly, an object of the present construction is to provide reinforcement in both lateral and transverse directions so as to hold rigidly any number of crates or boxes that may be placed upon the pallet; and the improved pallet of the invention is provided with means whereby the loaded boxes or crates are secured against slipping in any direction during transit.

Further, when the pallet is to be lifted from a floor or support, with the pallet loaded, by means of a lift truck, in the usual construction of such pallets, the lift fork of the truck can be inserted under the pallet only from one direction, whereas the present construction provides means enabling the introduction of a lift fork from any of four directions, the pallet of the present construction being non-directional in this respect, thereby materially increasing its convenience and flexibility of handling.

A still further object of the invention is to provide a pallet having the above-indicated characteristics that is made of sheet metal which is capable of being manufactured at relatively low cost, and which at the same time embodies strength and durability.

Further objects of the invention will become apparent as the description proceeds, and the features of novelty will be pointed out in particularity in the appended claims; and the accompanying drawings indicate by way of example, a structural embodiment of the features of the present invention as applied to a pallet of universal application.

The invention will be understood more readily by reference to the accompanying drawings, in which:

Figure 1 represents a plan view of a pallet embodying the structural features and improvements of the present invention;

Figure 2 is an end elevation thereof, as viewed from the bottom of Figure 1;

Figure 3 is a longitudinal sectional elevation taken along the line 3—3 of Figure 1, looking in the direction of the arrows;

Figure 4 is a further longitudinal sectional elevational view taken along the line 4—4 of Figure 1, looking in the direction of the arrows;

Figure 5 is a transverse end elevational view looking either to the right or to the left of Figure 1;

Figure 6 is a transverse sectional elevational view taken on the line 6—6 of Figure 1, looking in the direction of the arrows;

Figure 7 is a further transverse sectional elevational view taken on the line 7—7 of Figure 1, looking in the direction of the arrows;

Figure 8 is a diagrammatic longitudinal sectional elevation similar to Figure 3, but showing two of the improved pallets in nested relation;

Figure 9 is a diagrammatic transverse sectional elevation, similar to Figure 6, but indicating an assembly of two of the improved pallets in nested relation;

Figure 10 is an isometric perspective view of an improved pallet of the present invention; and Figure 11 is an end elevational view of the pallet of the present invention with a load applied to and secured in position on the pallet of the present invention.

Referring more particularly to the drawings, the improved pallet of the present invention comprises generally a body A, which has an upper platform surface 13, which is provided with spaced, parallel, longitudinal corrugations 15, the bottoms 17 of which form longitudinally extending ribs 19 that form supporting legs, which hold the platform 13 spaced sufficiently above a floor or other supporting surface to receive the forks of a fork-lift truck, not shown, approaching either end of the pallet.

The ribs 19 are notched or channeled as indicated at 21 to receive inverted channel members 23, which extend completely across the pallet platform and are welded in place. These transversely extending channels project beyond the plane of the side ribs 19, and the ends thereof are cut or otherwise formed into corresponding recesses 25 for the reception of sling cables or bridle sling with lifting bars for lifting and lowering the pallet into a ship hold or similar space. The longitudinal ribs 19 also are recessed or notched at each end thereof for receiving end angle bars 27 that are provided for reinforcement of the platform 13, the recesses 25 of the ends of the channel members 23, and similar recesses 29 of the end angle bars 27 being in alignment and adapted to receive sling rods 31 of sling hoisting means for lifting the platform, these rods 31 being adapted to extend along each side of the platform 13 and to project beyond the ends thereof to provide access for sling cable attached to these rods; or the rods may be received in the angle bars 27 where it is desired to lift the platform by its ends. Consequently, the pallet may be lifted in any direction it being non-directional with respect to application of the hoisting means.

It will be seen also from Figures 10 and 11 that intermediate the leg ribs 19 there are mounted metal inserts 33 having slots 35 therein, these inserts 33 being welded to the angle bars 27 and to the underside of the platform 13, recesses 37 being provided in the ends of the platform, these recesses 37 corresponding to the slots 35, thus providing reception for cargo retaining straps 39 for holding boxes, crates or other cargo 41. Similar slots 43 are provided along the longitudinal front and rear surfaces of the pallet.

The configuration of the ribs 19 may be noted. It will be seen that these ribs are formed with downwardly converging sides 45, 47, the distance between which is sufficiently wide to permit reception of similar rib-legs of another similar pallet, as shown in Figures 8 and 9, allowing the empty pallets to be nested thereby minimizing storage space required for the return of empty pallets. The ribs 19 are of equal height, presenting a level area which eliminates the need for chocking under projecting legs or edges when the pallets of this construction are stowed or stored on top of other cargo or palletized cargo. The inverted channels 23 provide fixed suspension points for each of the two forks of a fork-lift truck for lifting the pallet, and similarly such forks may be inserted endways of the pallet between the ribs 19, the present pallet differing importantly from the pallets of the prior art in this non-directional aspect, which enables a forktruck to pick up the pallet from any direction of approach.

From the foregoing description, it will be apparent that the features of the present invention are not limited necessarily to the particular embodiment of the invention herein described and illustrated specifically, such being in the nature of an exemplary embodiment only of the features of the invention, which may be varied widely as determined by service conditions; and it will be understood, therefore, that it is intended and desired to embrace within the scope of the invention, such modifications and changes as may be necessary to adapt it to varying conditions and uses, as defined in the appended claims. It also will be understood that the term "cargo" as employed in the claims is intended to include any kind of articles, irrespective of whether the articles are enclosed in boxes, crates, or other wrapping or containers which are handled or stowed on the improved pallet construction of the present invention.

Having thus described my invention, what I claim as new and wish to secure by Letters Patent is:

1. A pallet for carrying and stowing cargo, which comprises a platform, spaced parallel corrugations in the platform having bottoms defining supporting ribs having downwardly converging sides of a width sufficient to receive similar ribs of another pallet to be nested therewith, the said ribs supporting the platform above a supporting surface to enable insertion therebetween of forks of a lift-truck for lifting the platform off from its supporting surface, and transverse parallel inverted channel members secured to the platform on the under surface thereof, the said members also being adapted to receive the forks of a lift-truck, whereby the platform may be lifted by the truck from any direction of approach.

2. A pallet for carrying and stowing cargo, which comprises a platform having spaced, parallel, longitudinally-extending corrugations therein, the corrugations having bottoms defining supporting ribs for the platform having downwardly converging sides of a width sufficient to receive similar ribs of another pallet to be nested therewith, the said ribs supporting the platform above a supporting surface to enable insertion therebetween endways of the platform, of forks of a lift-truck for lifting the platform longitudinally from its supporting surface, transversely-extending, parallel, inverted channel members secured to the platform therebeneath, the said members being adapted to receive the forks of a lift-truck inserted laterally of the platform, whereby the platform may be lifted by the truck from any direction of approach, reinforcing means for the platform extending transversely thereof at each end of the platform, the reinforcing means and the inverted channel members having ends extending beyond both sides of the platform, and means adjacent to the ends of the reinforcing means and of the inverted channel members for receiving bars of sling-hoisting means for hoisting the platform.

3. A pallet for carrying and stowing cargo, which comprises a platform having spaced, parallel, longitudinally-extending corrugations therein, the corrugations having bottoms defining supporting ribs for the platform having downwardly converging sides of a width enabling nesting therein of similar ribs of another similar pallet, the said ribs supporting the platform above a supporting surface to enable insertion therebetween longitudinally of the platform, of forks of a lift-truck for lifting the platform longitudinally from its supporting surface, transversely-extending parallel, inverted channel members secured to the platform therebeneath, the said members being adapted to receive the forks of a lift-truck inserted laterally of the platform, whereby the platform may be lifted from any direction of approach, and reinforcing means for the platform extending transversely thereof at each end of the platform, the reinforcing means including angle bars secured to the platform therebeneath, the angle bars and the inverted channel members having ends extending beyond both sides of the platform, the angle bars and inverted channel members being recessed adjacent to their extending ends for receiving, longitudinally of the platform, hoisting bars of sling-hoisting means for hoisting the platform, the end angle bars being adapted to receive therein such hoisting bars inserted therein transversely of the platform.

4. A pallet for carrying and stowing cargo, which comprises a platform having spaced, parallel, longitudinally-extending corrugations therein, the corrugations having downwardly converging sides of a width enabling nesting therein of similar ribs of another similar pallet, the said ribs supporting the platform above a supporting surface to enable insertion therebetween, longitudinally of the platform, of forks of a lift-truck for lifting the platform longitudinally from the supporting surface, transversely-extending, parallel, inverted channel members secured to the platform therebeneath, the said members being adapted to receive the forks of a lift-truck inserted therein laterally of the platform, whereby the platform may be lifted from any direction of approach, reinforcing means for the platform extending transversely thereof at each end of the platform, the reinforcing means including angle bars secured to the platform therebeneath, the angle bars and the inverted channel members having ends extending beyond both sides of the platform, the angle bars and inverted channel members being recessed adjacent to their extending ends for receiving, longitudinally of the platform, hoisting bars of sling-hoisting means for hoisting the platform, the end angle bars being adapted to receive therein between the sides thereof such hoisting bars inserted therein transversely of the platform, and reinforcing inserts mounted on the platform and on the angle bars at each end of the platform intermediate the said ribs, the said inserts and the platform being adapted to receive the means for securing a load on the platform.

EDGAR C. SEWARD.

REFERENCES CITED

The following references are of record in the file of this patent:

UNITED STATES PATENTS

| Number | Name | Date |
| --- | --- | --- |
| 1,605,901 | O'Neil | Nov. 2, 1926 |
| 2,412,184 | Ulinski | Dec. 3, 1946 |

OTHER REFERENCES

Lewis-Sheppard Platform Article, May 11, 1928. (Copy in Div. 52.)